United States Patent [19]

Brusasco

[11] 4,402,160
[45] Sep. 6, 1983

[54] WINDOW WINDER DEVICE WITH FLEXIBLE DRIVE SCREW

[75] Inventor: Enzo Brusasco, Turin, Italy
[73] Assignee: Roltra, S.p.A., Turin, Italy
[21] Appl. No.: 263,137
[22] Filed: May 13, 1981
[30] Foreign Application Priority Data May 22, 1980 [IT] Italy ............................. 53220/80[U]

[51] Int. Cl.³ ............................................. E05F 11/48
[52] U.S. Cl. ................................. 49/352; 74/501 R; 74/422
[58] Field of Search ................ 49/325, 352; 74/422, 74/501; 57/212, 222, 223

[56] References Cited

U.S. PATENT DOCUMENTS 3,163,054 12/1964 Werner ........................ 74/501 X
3,950,934 4/1976 Irwin ............................... 57/223

FOREIGN PATENT DOCUMENTS 530047 9/1956 Canada ............................ 49/325
2264072 8/1973 Fed. Rep. of Germany ....... 74/422
1292950 10/1972 United Kingdom ............. 49/352

*Primary Examiner*—Kenneth Downey
*Attorney, Agent, or Firm*—Merriam, Marshall & Bicknell

[57] ABSTRACT

A window winder device, particularly for control of windows of motor vehicles, in which a plate connectable to one edge of an associated window is mounted to be slidable along a guide parallel to the direction of movement of the said window and is displaceable along the said guide by means of a flexible actuator member comprising a flexible metal core fixed within an outer cover of synthetic material, the said cover has an external threading coupled with toothed drive means.

7 Claims, 7 Drawing Figures

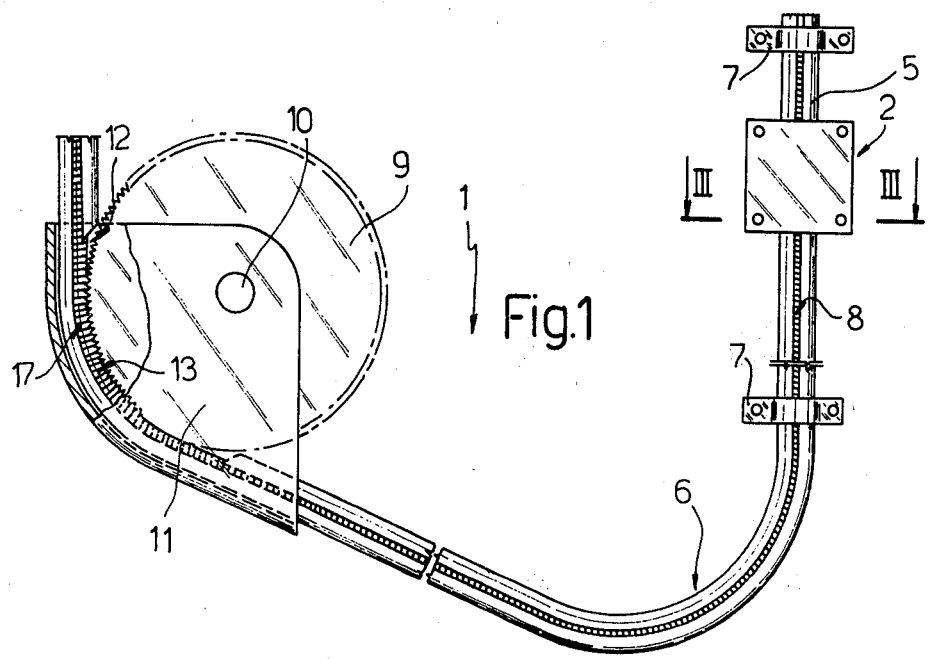
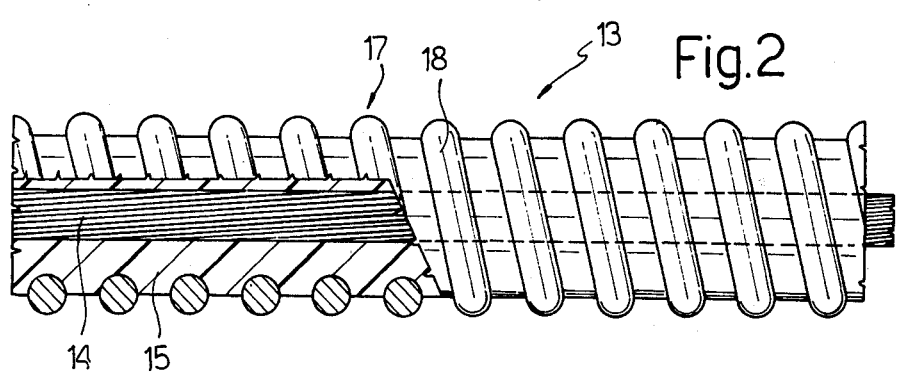
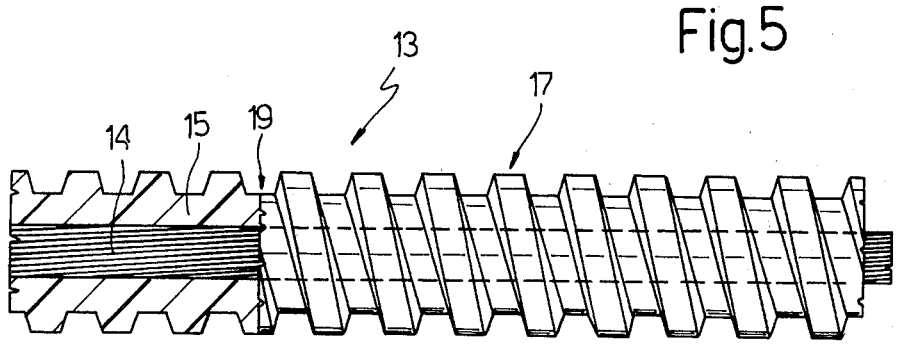

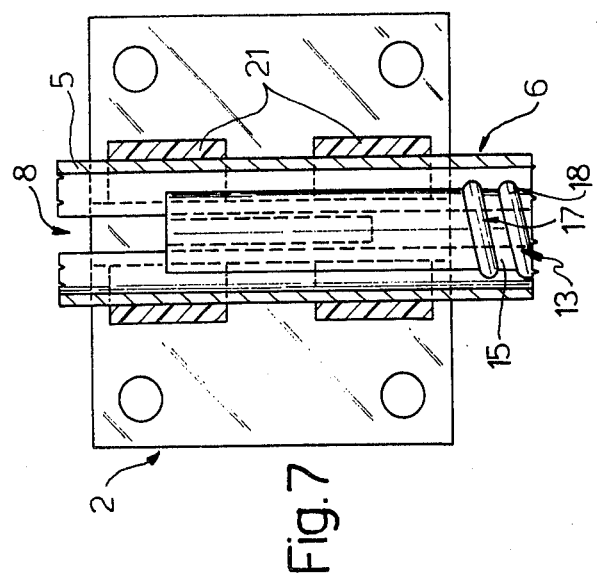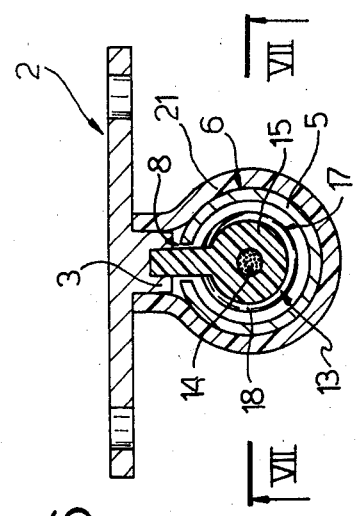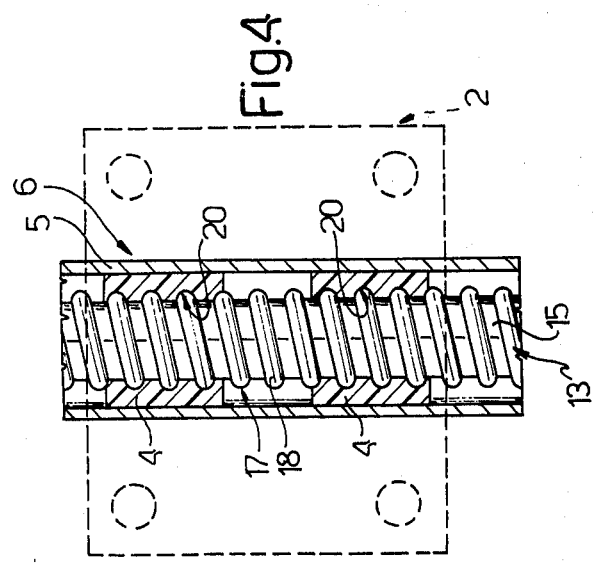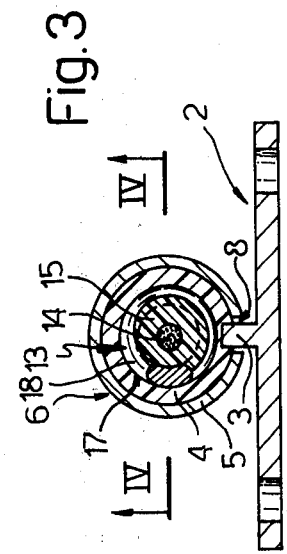

WINDOW WINDER DEVICE WITH FLEXIBLE DRIVE SCREW

BACKGROUND OF THE INVENTION

The present invention relates to a window winder device particularly adapted to be mounted on a motor vehicle door for controlling the vertical displacement of a movable window pane thereof.

Window winder devices known up to now have included those in which a slide, mounted so as to be slidable along a guide and connectible to a lower edge of the movable window pane, is displaced along the said guide by means of a flexible actuator member constituted by a metal cable about which there is helically wound a metal wire defining, about the said cable, a helical thread meshing with toothed drive means which can impart to and fro movements to the said metal cable within a fixed flexible cover the function of which is to prevent the said metal cable from deforming when subjected to compression forces.

The above described known window winder devices normally have the disadvantage of allowing the window to be lowered when a relatively low downward force is applied to it externally. This is due to the fact that any compression force applied to the window from the outside is converted into a compression force applied to the turns of the said helical metal wire at the point of coupling between these latter and the drive means. Since the sliding of the said turns toward one another along the metal cable corresponds to an increase in the diameter of the turns themselves, when the static friction has been overcome, these latter compress in the manner of a spring against one another freeing the window which can thus easily be lowered from the outside.

The above described known window winder devices, again because of the possible sliding of the turns of the said metal wire along the metal cable, can easily become jammed since the pitch of the said helical wire can easily not correspond to the pitch of the said toothed drive means.

SUMMARY OF THE INVENTION

The object of the present invention is that of providing a window winder device which will be free from the above described disadvantages.

The said object is achieved by the present invention in that it relates to a window winder device, particularly for the control of the movable windows of motor vehicles, comprising a plate connectable to one edge of an associated window pane, at least one guide slidably coupled to the said plate and disposed parallel to the direction of displacement of the said window pane, a flexible actuator member connected to the said plate by attachment means for displacing it along the said guide, and drive means able to impart to and fro movements to the said flexible actuator means, characterised by the fact that the said actuator member is constituted by a flexible screw comprising a flexible metal core and an outer cover of synthetic material fixed with respect to the said core.

BRIEF DESCRIPTION OF THE DRAWINGS

Further characteristics and advantages of the present invention will become apparent from the following description with reference to the attached drawings, which illustrate various non-limitative embodiments, and in which:

FIG. 1 is a schematic side view of a window winder device formed according to the principles of the present invention;

FIG. 2 is an enlarged and partially sectioned view of a first detail of FIG. 1;

FIG. 3 is a section taken on the line III—III of FIG. 1;

FIG. 4 is a section taken on the line IV—IV of FIG. 3;

FIG. 5 is a partially sectioned enlarged view of a variant of a detail of FIG. 2;

FIG. 6 is a section similar to that of FIG. 3 relating to a variant of the device of FIG. 1; and FIG. 7 is a section taken on the line VII—VII of FIG. 6.

DETAILED DESCRIPTION OF THE INVENTION

FIG. 1 relates to a window winder device generally indicated 1 and including a plate 2 connectable to the lower edge of a movable window pane (not illustrated) of a motor vehicle door (not illustrated).

As illustrated in FIG. 3, the plate 2 has two projections 3 (only one of which is illustrated), the free end of each of which is rigidly connected to the outer periphery of an associated cylindrical bush 4 the axis of which lies parallel to the plane of the plate 2. The bushes 4, of which there could be a number different from two, are disposed coaxially with respect to one another and are coupled slidably to the inner cylindrical surface of a substantially straight end portion 5 of a curved tubular element generally indicated 6 and connectable to the inner surface of the said door (not illustrated) by means of a plurality of brackets 7 disposed along the edge portion 5. Through the whole of the length of this latter extends a longitudinal slit 8 (FIG. 3) slidably engaged by the projections 3.

As illustrated in FIG. 1, the tubular element 6 is folded into a substantially U-shape and is wound adjacent its end opposite the end portion 5 about the periphery of a helically toothed wheel 9 keyed onto a rotatable shaft 10 constituting the drive for the movement of the device 1.

To the shaft 10 there is freely connected a U-shaped bracket 11, the arms of which extend on opposite sides of the toothed wheel 9 and about the tubular element 6 to maintain this latter in a fixed position about the toothed wheel 9. In this position the periphery of the toothed wheel 9 penetrates the interior of the tubular element 6 through a lateral slit 12 formed in this latter, and meshes with an actuator member 13 slidably mounted within the tubular element 6 and constituted by a flexible screw.

As illustrated in FIG. 2, the flexible screw 13 comprises an inner metal core constituted by a flexible metal cable 14 which is disposed in position fixed within a flexible tubular cover 15 made of a synthetic material, preferably of plastics material. The flexible cover 15 has an external threading 17 defined by a metal wire 18 helically wound about the cover 15 and partially inserted into it.

In the variant of FIG. 5, the threading 17 is obtained by forming a helical groove 19 directly on the outer surface of the cover 15.

The flexible screw 13 extends along the tubular element 6 and engages (FIG. 4) a threading 20 formed within each bush 4 in such a way as to be rigidly connected to the plate 2.

In the variant illustrated in FIGS. 6 and 7, the threaded bushes 4 are omitted and the plate 2 has a single projection 3 which extends through the slit 8 and is only connected to the screw 13. In the case of the variant of FIGS. 6 and 7, the displacements of the plate 2 along the end portion 5 of the tubular element 6 are guided by two cylindrical bushes 21 slidably fitted onto the said end portion 5 and rigidly connected to the plate 2.

In a variant, not illustrated, the plate 2 is provided with two further bushes coupled in a slidable manner to a further guide parallel to the said portion 5 and operable to prevent any rotation of the plate 2 about an axis perpendicular to the plane of FIG. 1. A similar solution having two guides has been found to be particularly useful in cases where the window pane is not guided laterally as occurs, for example, in convertible motor cars.

In use, the coupling between the toothed wheel 9 and the screw 13 behaves as a rack and pinion coupling such that a rotation of the shaft 10 gives rise to a corresponding axial displacement of the screw 13 along the tubular element 6 and, therefore, a similar displacement of the plate 2 and of the associated window pane.

As far as the screw 13 is concerned, it is appropriate to observe that it is subjected to compression forces during the raising of the window pane and to tension forces during the lowering of the window pane, and it behaves equally well in both situations because of its composite structure. In fact, the metal cable 14 is suitable for supporting tension forces whilst the cover 15 easily absorbs compression forces.

In the case in which the flexible screw 13 is formed according to the embodiment illustrated in FIG. 2, the flexible cover 15 performs the further function of preventing the turns of the metal wire 18 from approaching one another.

Naturally, the principle of the invention remaining the same, it would be possible to introduce numerous modifications to the window winder device described without by this departing from the scope of the present invention.

I claim:

1. A window winder device, particularly for the control of the movable windows of motor vehicles, comprising a plate connectable to one edge of an associated window pane, at least one guide slidably coupled to the said plate and disposed parallel to the direction of displacement of the said window pane, a flexible actuator member connected to the said plate by attachment means (3), for displacing it along the said guide, and drive means operable to impart to and fro movements to the said flexible actuator member, characterised by the said actuator member being a flexible screw (13) comprising a flexible metal core (14) and an outer cover (15) of synthetic material, fixed to the said core (14), having means thereon engageable with the teeth of a toothed wheel whereby rotation of the toothed wheel will drive the screw longitudinally.

2. A device according to claim 1, characterised by the fact that the said flexible screw (13) has an external threading (17) formed in the thickness of the said outer cover (15).

3. A device according to claim 1, characterised by the fact that the said flexible screw (13) has an external threading (17) defining by a metal wire (18) helically wound about the said outer cover (15) and partially embedded into it.

4. A device according to claim 1, characterised by the fact that the said guide is constituted by an end portion (5) of a tubular element (6) internally engaged, in a slidable manner, by the said flexible screw (30).

5. A device according to claim 4, characterised by the fact that the said end portion (5) of the said tubular element (6) has a longitudinal slit (8) engaged in a slidable manner by the said attachment means (3).

6. A device according to claim 5, characterised by the fact that the said attachment means comprise at least two internally threaded cylindrical bushes (4) engaged by the said flexible screw (13) and slidably mounted within the said end portion (5) of the said tubular element (6); each said bush (4) having an outer radial projection (3) extending through the said slit (8) and rigidly connected to the said plate (2).

7. A window winder device, particularly for the control of the movable windows of motor vehicles, comprising:

a plate connectable to one edge of an associated window pane;

at least one guide slidably coupled to the said plate and disposed parallel to the direction of displacement of the said window pane;

said guide constituting an end portion (5) of a tubular element (6) internally engaged, in a slidable manner, by a flexible screw (13) connected to the said plate by attachment means (3) for displacing it along the said guide;

the flexible screw (13) having a flexible metal core (14) and an outer cover (15) of synthetic material fixed to the said core (14);

the end portion (5) of the said tubular element (6) having a longitudinal slit (8) engaged in a slidable manner by the said attachment means (3);

the said attachment means comprising a projection (3) extending radially from one end of the said flexible screw (13) through the said slit (8) and connected to the said plate (2), this latter having rigidly connected thereto at least two cylindrical bushes (21) slidably coupled to an outer cylindrical surface of the said end portion (5) of the said tubular element (6); and drive means operable to impart to and fro movements to the said flexible screw member.

* * * * *